(12) United States Patent
Gentile et al.

(10) Patent No.: US 9,875,147 B2
(45) Date of Patent: *Jan. 23, 2018

(54) MANAGEMENT OF ASYNCHRONOUS AND SYNCHRONOUS RESOURCE REQUESTS

(71) Applicant: International Business Machines Corporation, Armonk, NY (US)

(72) Inventors: Joseph W. Gentile, New Paltz, NY (US); Jie Hou, Ossining, NY (US); Andrew M. Sica, Oxford, CT (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,298

(22) Filed: Aug. 18, 2016

(65) Prior Publication Data

US 2016/0378571 A1 Dec. 29, 2016

Related U.S. Application Data

(63) Continuation of application No. 15/080,682, filed on Mar. 25, 2016, now Pat. No. 9,461,843, which is a
(Continued)

(51) Int. Cl.
*G06F 9/50* (2006.01)
*G06F 12/00* (2006.01)
(Continued)

(52) U.S. Cl.
CPC .............. *G06F 9/52* (2013.01); *G06F 9/50* (2013.01); *G06F 9/5005* (2013.01);
(Continued)

(58) Field of Classification Search
CPC ...... G06F 9/5016; G06F 9/5005; G06F 12/00; G06F 9/5027; G06F 9/52; G06F 9/50;
(Continued)

(56) References Cited

U.S. PATENT DOCUMENTS 8,032,930 B2  10/2011 Hicks
8,244,903 B2   8/2012 Bono
(Continued)

FOREIGN PATENT DOCUMENTS

WO     2013056571 A1    4/2013

OTHER PUBLICATIONS

IBM, List of IBM Patents or Patent Applications Treated as Related, Appendix P, dated Aug. 23, 2016, 2 pages.
(Continued)

*Primary Examiner* — Kenneth R Coulter
(74) *Attorney, Agent, or Firm* — Robert C. Bunker

(57) ABSTRACT

Managing requests for acquiring resources in a computing environment. A first request to acquire resources is received. Whether the resources have been pre-acquired is determined. If the resources have not been pre-acquired, a token registering interest of a first thread in the first request is subscribed to. If the acquisition of the resources is not successful, whether a prior synchronous request has been initiated by a thread for the first request is determined. If a prior synchronous request has not been initiated, a synchronous request is initiated to acquire the resources. If the resources have not been pre-acquired for a second received request, an interest is registered of a second thread in the first request using the token. If the acquisition of the one or more resources is successful, a thread is notified of the successful acquisition, and the interest of the second thread is unregistered in the first request.

1 Claim, 5 Drawing Sheets

Related U.S. Application Data continuation of application No. 14/747,033, filed on Jun. 23, 2015.

(51) Int. Cl.
*G06F 9/52* (2006.01)
*H04L 12/911* (2013.01)
*H04L 29/08* (2006.01)

(52) U.S. Cl.
CPC .......... *G06F 9/5016* (2013.01); *G06F 9/5027* (2013.01); *G06F 12/00* (2013.01); *H04L 47/70* (2013.01); *H04L 67/1095* (2013.01); *H04L 67/1097* (2013.01)

(58) Field of Classification Search
CPC ..... H04L 47/76; H04L 47/70; H04L 67/1095; H04L 67/1097
USPC ................ 709/226, 223, 217–219, 231, 248
See application file for complete search history.

(56) References Cited

U.S. PATENT DOCUMENTS

| | | | |
|---|---|---|---|
| 8,392,912 B2 | 3/2013 | Davis et al. | |
| 8,539,186 B2 | 9/2013 | Sechrest et al. | |
| 9,009,448 B2 | 4/2015 | Ruehle et al. | |
| 9,047,387 B2 | 6/2015 | Hicks | |
| 9,461,843 B1 * | 10/2016 | Gentile | G06F 9/5016 |
| 9,477,526 B2 * | 10/2016 | Johnson | G06F 9/5016 |
| 2005/0138195 A1 | 6/2005 | Bono | |
| 2007/0019636 A1 | 1/2007 | Lau et al. | |
| 2007/0283115 A1 | 12/2007 | Freeman et al. | |
| 2008/0244232 A1 | 10/2008 | Sherman et al. | |
| 2010/0107227 A1 | 4/2010 | Hicks | |
| 2011/0282909 A1 | 11/2011 | Hicks | |
| 2012/0005449 A1 | 1/2012 | Reed et al. | |
| 2013/0046954 A1 | 2/2013 | Ruehle et al. | |
| 2015/0067691 A1 | 3/2015 | Johnson et al. | |
| 2016/0055017 A1 | 2/2016 | Beveridge et al. | |
| 2016/0072729 A1 | 3/2016 | Sasin et al. | |
| 2016/0381137 A1 | 12/2016 | Gentile et al. | |

OTHER PUBLICATIONS

Pending U.S. Appl. No. 15/080,682, filed Mar. 25, 2016, entitled: "Management of Asynchronous and Synchronous Resource Requests".
Pending U.S. Appl. No. 14/747,0332, filed Jun. 23, 2016, entitled: "Management of Asynchronous and Synchronous Resource Requests".

* cited by examiner

MANAGEMENT OF ASYNCHRONOUS AND SYNCHRONOUS RESOURCE REQUESTS

BACKGROUND OF THE INVENTION

The present invention relates generally to the field of resource management, and more particularly to managing asynchronous and synchronous requests for acquiring resources in a computing environment.

Computing or system resources are physical or virtual components of limited availability within a computing environment. Resource management is a critical task for preventing resource leaks (i.e., a component of the computing environment does not release a resource after it is acquired), as well as handling resource contention (i.e., conflict over access to a shared resource, such as, random access memory, disk storage, cache memory, external network devices, etc.).

A plurality of components may be implemented in a computing environment, each component having one or more resources requiring resource management to facilitate a primary operation. For example, the primary operation may include a log stream offload (i.e., movement of log stream data from one storage medium to another storage medium in a multi-system environment) which may require resource management of the one or more storage media. In this instance, it is necessary to allocate storage resources of a storage medium that is receiving the log stream data, so that log stream data write requests do not fail, or may result in undesirable functionality of components in the computing environment.

SUMMARY

Embodiments of the present invention provide systems, methods, and computer program products for managing requests for acquiring one or more resources in a computing environment. A first request to acquire one or more resources for resource management in a computing environment is received. Whether the one or more resources have been pre-acquired is determined. Responsive to determining that the one or more resources have not been pre-acquired, a token is subscribed by registering interest of a first thread of a plurality of threads in the first request, wherein the token manages information associated with the first request and can be accessed by each of the plurality of threads, and wherein the plurality of threads include: an initiator thread, a performer thread, and a tracker thread, wherein the initiator thread receives the first request and instructs the performer thread to acquire the one or more resources, and the tracker thread tracks status of acquisition of the one or more resources. Whether acquisition of the one or more resources is successful is determined. Responsive to determining that the acquisition of the one or more resources is not successful, whether a prior synchronous request has been initiated, by a thread of the plurality of threads, for the first request, is determined. Responsive to determining that a prior synchronous request has not been initiated, a synchronous request is initiated to acquire the one or more resources. A second request to acquire the one or more resources to perform resource management in the computing environment is received. Responsive to determining that the one or more resources have not been pre-acquired, an interest is registered of a second thread of the plurality of threads in the first request using the token. Whether acquisition of the one or more resources is successful is determined. Responsive to determining that the acquisition of the one or more resources is successful, a thread of the plurality of threads is notified of a successful acquisition result, and the interest of the second thread of the plurality of threads is unregistered in the first request.

DETAILED DESCRIPTION

Embodiments of the present invention provide systems and methods for managing threads and handling resources in a computing environment. Embodiments of the present invention provide methods and systems for obtaining resources for a particular operation and tracking statuses of the resources. Embodiments of the present invention provide methods and systems that convert an asynchronous request to acquire resources into a synchronous request, based on a thread's demand.

Figure 1:
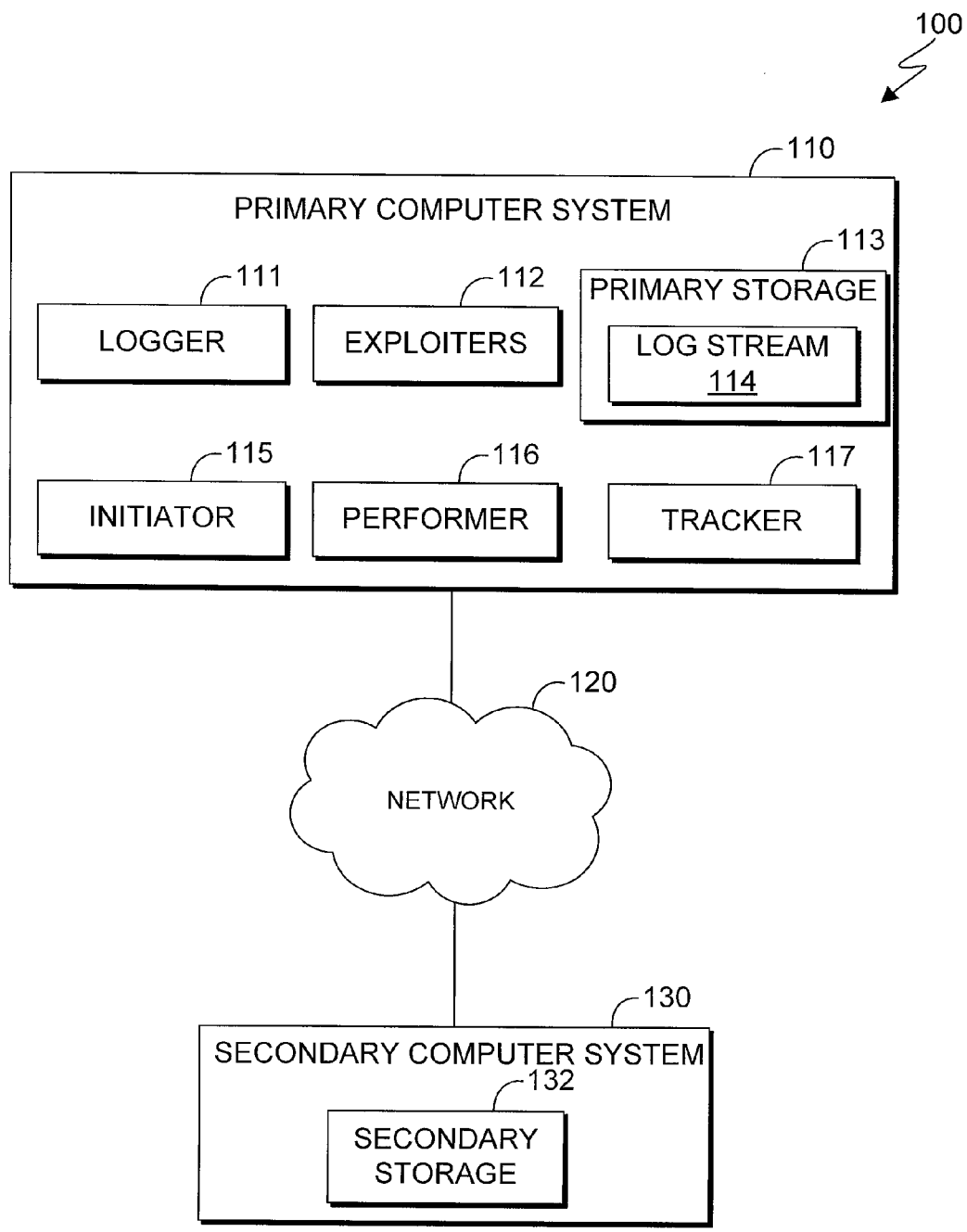
FIG. 1 is a block diagram of a computing environment, in accordance with an embodiment of the present invention.

FIG. 1 is a functional block diagram of computing environment 100, in accordance with an embodiment of the present invention. Computing environment 100 includes primary computer system 110 and secondary computer system 130 connected via network 120. Primary computer system 110 and secondary computer system 130 can be desktop computers, laptop computers, specialized computer servers, or any other computer systems known in the art. In certain embodiments, primary computer system 110 and secondary computer system 130 represent computer systems utilizing clustered computers and components to act as a single pool of seamless resources when accessed through network 120. In general, primary computer system 110 and secondary computer system 130 are representative of any electronic devices, or combination of electronic devices, capable of executing machine-readable program instructions, as described in greater detail with regard to FIG. 5.

Primary computer system 110 includes logger 111, exploiters 112, primary storage 113, initiator 115, performer 116, and tracker 117. In this embodiment, logger 111 provides logging services (i.e., manages log stream 114 data and other information regarding exploiters 112 log data). Logger 111 stores log stream 114 data in primary storage 113. Furthermore, logger 111 is configured to migrate log stream 114 data from primary storage 113 in primary computer system 110 to secondary storage 132 in secondary computer system 130. Migration of log stream 114 data is a process known as offload processing. In another embodiment, one or more exploiters 112 transmit log stream 114 data to logger 111. Furthermore, logger 111 manages archival and expiration of log stream 114 data thereafter (i.e., funnel-type exploiters) subsequent to receiving logs stream 114 data. In yet another embodiment, one or more exploiters 112 may use log stream 114 data actively, and explicitly deletes the log stream 114 data when it is no longer needed (i.e., active exploiters). In general, exploiters 112 may represent applications (e.g., subsystems, Multiple Virtual Storage components in a sysplex) that can use a coupling facility structure (e.g., primary storage 113, interim storage media, persistent storage media, etc.) and logger 111 to cache data, share queues and statuses, and access sysplex list structures, in order to implement high performance data sharing operations and rapid recovery operations. Furthermore, each one of exploiters 112 may have different performance and resource requirements. Accordingly, primary computer system 110 implements various threads (e.g., initiator 115, performer 116, and tracker 117) to manage resource requests made by primary computer system 110 and components therein.

Initiator 115, performer 116, and tracker 117 are threads of primary computer system 110, and are configured to handle resources of primary computer system 110. In certain embodiments, initiator 115, performer 116, and tracker 117 may also be configured to handle resources of secondary computer system 130. In this embodiment, initiator 115 is a thread that initiates a process to acquire a resource. Furthermore, the resource may be acquired prior to being allocated for a primary operation performed by one or more components of primary computer system 110, as described in greater detail with regard to FIG. 2. Performer 116 is another thread that obtains the resource, as described in greater detail with regard to FIG. 4. Tracker 117 is another thread that requires the resource to be acquired, such that the resource is acquired prior to allocating the resource for a primary operation performed by one or more components of primary computer system 110, as described in greater detail with regard to FIG. 3. Each thread of primary computer system 110 (i.e., initiator 115, performer 116, and tracker 117) communicates using tokens. The term, "tokens," as used herein, refers to a communication mechanism used by various threads to facilitate thread services. For example, information associated with tokens (e.g., a general interest count) may be updated to represent a weight or demand for acquiring a resource. Furthermore, tokens are created, modified, and managed in a token area of primary storage 113 by primary computer system 110 and components therein to synchronize processes between initiator 115, performer 116, and tracker 117.

Secondary computer system 130 includes secondary storage 132. In this embodiment, secondary storage 132 is used to store log stream 114 data during offload processing. For example, secondary storage 132 may be a persistent storage medium, such as data sets on a direct-access storage device (DASD).

Network 120 can be, for example, a local area network (LAN), a wide area network (WAN) such as the Internet, or a combination of the two, and include wired, wireless, or fiber optic connections. In general, network 120 can be any combination of connections and protocols that will support communications between primary computer system 110 and secondary computer system 130, in accordance with a desired embodiment of the invention.

Offload processing is a primary operation performed by logger 111 that requires resource management of primary computer system 110 and secondary computer system 130. In certain embodiments, resource management for a primary operation not described herein, may be implemented by computing environment 100. Furthermore, additional components of computing systems not illustrated may be implemented by computing environment 100 that also require resource management. For example, another primary operation may require resource management of another instance of resource, such as, computational resources or network resources by one or more components of computing environment 100 not shown.

Figure 2:
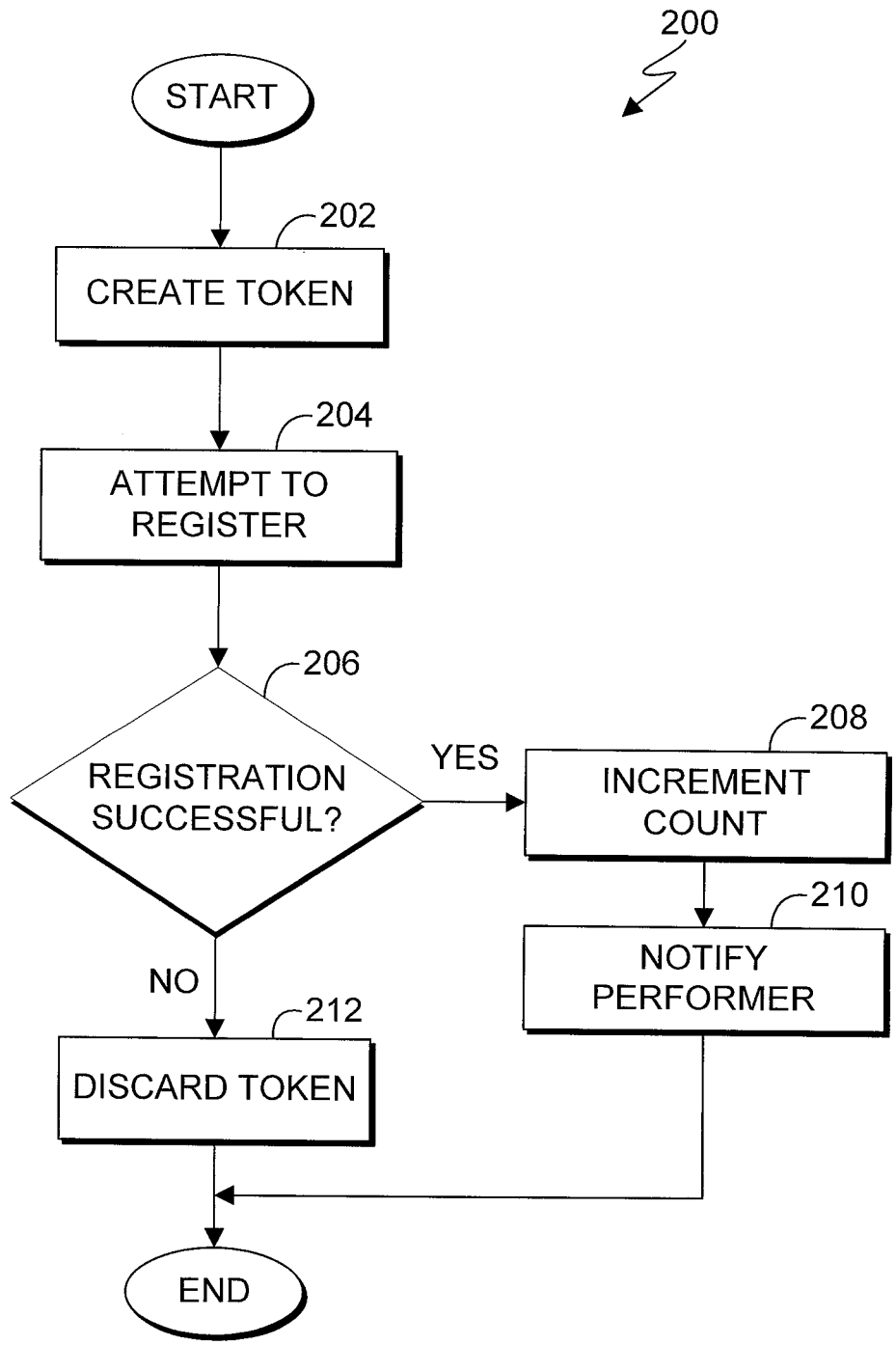
FIG. 2 is a flowchart illustrating operational steps for initiating acquirement of a resource, in accordance with an embodiment of the present invention.

FIG. 2 is a flowchart 200 illustrating operational steps for initiating acquirement of a resource, in accordance with an embodiment of the present invention. In this embodiment, initiator 115 is a thread responsible for initiating acquirement of the resource. As previously discussed, acquirement of the resource may be necessary to effectively perform a primary operation (e.g., offload processing). For example, a successful offload processing operation may require acquirement of a storage resource. In this instance, initiator 115 may initiate acquirement of the storage resource and maintain synchronous communication with other threads by creating and updating tokens in a token area and associated data areas.

In step 202, initiator 115 creates a token to acquire a resource. In this embodiment, a request to acquire a resource is associated with a created token stored in a token area. Furthermore, associated data areas may store information pertinent to the created token, such as a pointer, for anchoring the created token in the associated data areas. For example, initiator 115 may indicate that the token area and the associated data areas are used to maintain and update the created token. In one embodiment, initiator 115 may create a token for handling communication between threads (i.e., initiator 115, performer 116, and tracker 117) during acquirement of a storage resource to facilitate an offload processing operation. In another embodiment, initiator 115 may create a token to handle communication between threads during acquirement of another instance of a resource to facilitate another primary operation.

In step 204, initiator 115 attempts to register to the created token. In this embodiment, initiator 115 attempts to register to the created token by attempting to anchor the created token to the associated data area. For example, the associated data area may provide an indication via a pointer, specifying that the created token is anchored to the associated data area. Initiator 115 may register to the created token, such that initiator 115 is configured to update and reference the created token. Furthermore, initiator 115 registers to the created token to maintain synchronous communication with other threads having successfully registered to the created token (i.e., tracker 117 and performer 116).

In step 206, initiator 115 determines whether registration to the created token is successful. In this embodiment, initiator 115 determines whether initiator 115 successfully registered to the created token, based on whether initiator 115 successfully anchored the created token to the associated data areas. For example, if a pointer has been previously written for the created token (i.e., a previously anchored token), then initiator 115 may not successfully register to the created token. In another example, if a pointer has not been written for the created token, then initiator 115 may successfully register to the created token and anchor the created token to the associated data areas. Accordingly, anchoring the created token to the associated data areas enables other threads (i.e., tracker 117 and performer 116) to reference the associated data areas and use the created token.

If in step 206, initiator 115 determines that registration to the created token is successful (i.e., the created token was successfully anchored to the associated data area), then in step 208, initiator 115 increments a general interest count in the associated data area for the created token by 1. The phrase, "general interest count," as used herein, represents an interest level, weight, or demand associated with a particular request to acquire an instance of resource. In one embodiment, the general interest count associated with a token can be decremented or incremented by using serialized atomic instructions. For example, a greater general interest count may be associated with a token that has a greater number of threads subscribed or registered to the created token. In another example, if a general interest count associated with a token equals zero, then no thread is currently subscribed or registered to the token and the token area and associated data areas should be made available for creation of a new token.

If in step 206 initiator 115 determines registration to the created token is successful, then in step 212, initiator 115 discards the created token. In this embodiment, initiator 115 discards the created token by indicating that the token area and associated data areas are no longer required for maintaining and updating the created token. Furthermore, once the token area and associated data areas are discarded for the created token, the token area and associated data areas are capable of storing a token created at a later time for a different request to acquire another resource.

In step 210, initiator 115 notifies performer 116 of the created token and the associated request to acquire a resource. In one embodiment, initiator 115 may notify performer 116 by queuing the token area and the associated data areas to performer 116. Accordingly, once performer 116 is notified of the created token and the associated request to acquire the resource, performer 116 is configured to acquire the resource using the queued token area and associated data areas storing the created token. In one embodiment, the notification sent by initiator 115 can indicate a synchronous request to acquire a resource or an asynchronous request to acquire a resource. For example, the synchronous request may indicate in the token to suspend certain activity on one or more threads until acquirement of the requested resource is successful. In another example, the asynchronous request may indicate in the token area to acquire the requested resource without suspending any activity on the one or more threads.

Figure 3:
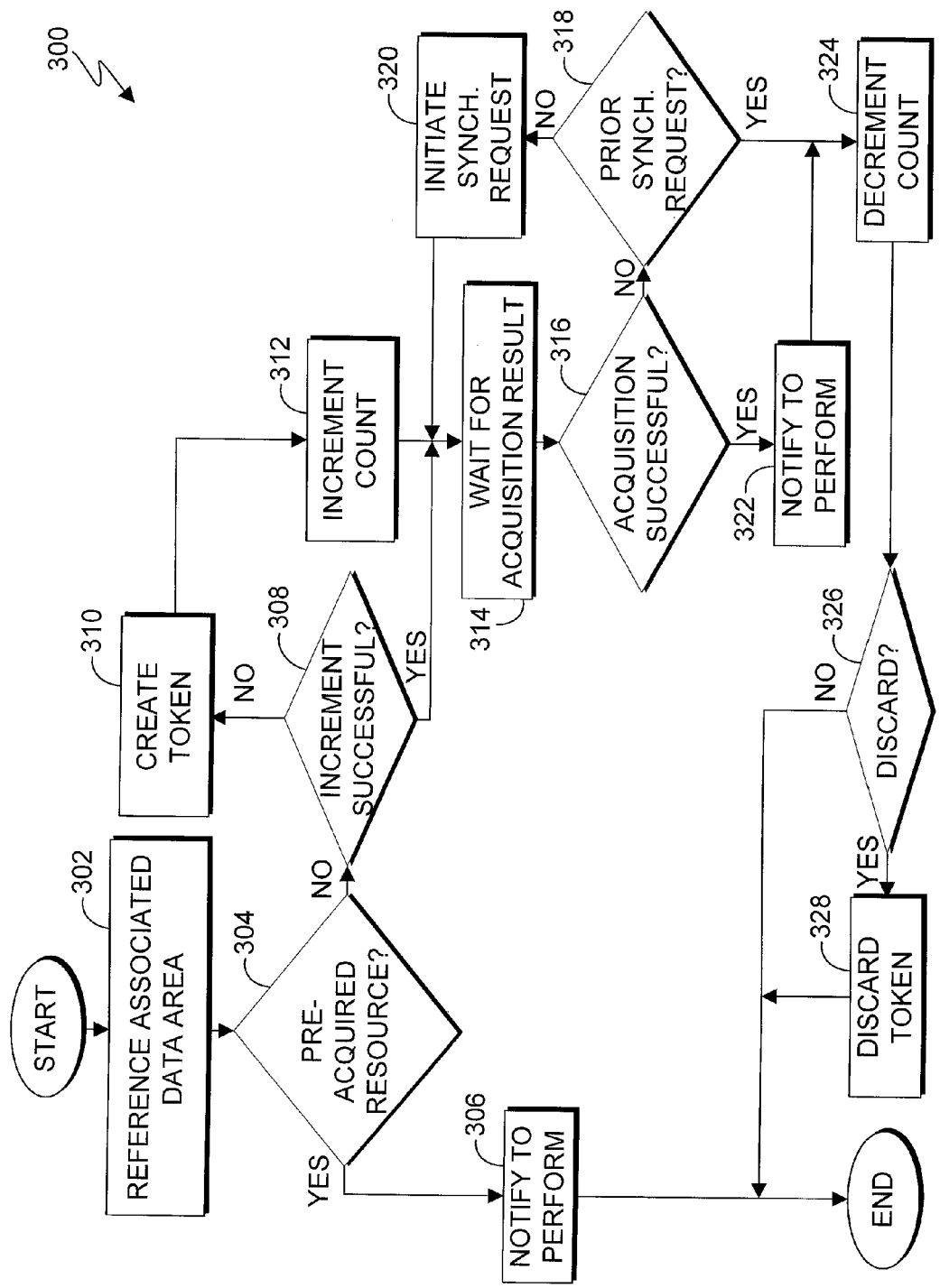
FIG. 3 is a flowchart illustrating operational steps for tracking a request to acquire a resource, in accordance with an embodiment of the present invention.

FIG. 3 is a flowchart 300 illustrating operational steps for tracking a request to acquire a resource, in accordance with an embodiment of the present invention. In this embodiment, tracker 117 tracks the request to acquire the resource, such that the requested resource can be used for the primary operation. As previously discussed, the primary operation may be offload processing, but can include other operations that require acquirement of one or more resource instances on primary computer system 110 or secondary computer system 130 (e.g., computational resources, network resources, etc.). In this embodiment, tracker 117 maintains synchronous communication with other threads by registering to tokens in a token area and associated data areas. Tracker 117 may update the registered token with information regarding a request to perform a primary operation. Furthermore, tracker 117 may obtain a token area and associated data areas for a token, to track a status of the token. For example, tracker 117 may register to a token to track whether a requested resource has been successfully acquired.

In step 302, tracker 117 references an associated data area. In this embodiment, tracker 117 references the associated data area to determine whether the associated data area has an anchored token associated with a request to acquire a resource. In one embodiment, tracker 117 may reference the associated data area prior to performer 116 acquiring the resource, and/or subsequent to performer 116 acquiring the resource. For example, tracker 117 may reference the associated data areas to identify a request to acquire one or more resources, and as a result, tracker 117 attempts to obtain a token associated with a request to acquire the one or more resources. In one instance, tracker 117 may obtain a token previously created by initiator 115 and performer 116 may successfully acquire a requested resource. In another instance, tracker 117 may obtain a token, wherein the token's associated request to acquire a resource has not yet been completed by performer 116.

In step 304, tracker 117 determines whether the resource required to perform the primary operation has been pre-acquired. For example, if an offload processing operation requires a number of available storage units on secondary storage 132, then tracker 117 determines whether the number of available storage units have been pre-acquired.

If in step 304, tracker 117 determines that the resource required to perform the primary operation has been pre-acquired, then in step 306, tracker 117 issues a notification to perform the primary operation. For example, tracker 117 may have determined that all required secondary storage 132 units were available (i.e., pre-acquired) to perform the offload processing operation by analyzing an update provided by performer 116, as described in greater detail with regard to FIG. 4. In this instance, tracker 117 may issue a notification to primary computer system 110 indicating that all the required secondary storage 132 units were pre-acquired and that primary computer system 110 and components therein (i.e., logger 111) may perform the offload processing operation.

If in step 304, tracker 117 determines that the resource required to perform the primary operation has not been pre-acquired, then in step 308, tracker 117 determines whether attempting to increment a general interest count is successful. In one embodiment, tracker 117 uses the referenced associated data area, as described in step 302, to determine whether tracker 117 can increment the general interest count. In this embodiment, incrementing a general interest count indicates that tracker 117 is now subscribed, or registered to the token anchored in the referenced associated data area.

If in step 308, tracker 117 determines that the attempt to increment the general interest count is not successful (i.e., registration to the token is not successful), then in step 310, tracker 117 creates a new token associated with the request to acquire the resource. In one embodiment, tracker 117 may indicate to initiator 115 to create a new token associated with the request to acquire the resource. Furthermore, once the token is created, the newly created token is anchored to the referenced associated data area.

In step 312, tracker 117 increments a general interest count in the token by 1 to indicate that tracker 117 has successfully registered interest to the token. In this embodiment, tracker 117 increases the general use count using to indicate the increased weight or demand for acquiring the requested resource.

If in step 308, tracker 117 determines that the attempt to increment a general interest count is successful, then in step 314, tracker 117 waits for a resource acquisition result. In this embodiment, the resource acquisition result is provided by performer 116, as described in greater detail with regard to FIG. 4. Furthermore, tracker 117 may wait for a resource acquisition result subsequent to tracker 117 initiating a synchronous request to acquire a resource, or subsequent to tracker 117 registering to a token associated with an asynchronous request to acquire the resource. In another embodiment, tracker 116 may wait for a resource acquisition result subsequent to creating a new token and incrementing a general interest count associated with the token, as previously described with regard to steps 310 and 312.

In step 316, tracker 117 determines whether resource acquisition was successful for the request associated with the token to acquire the resource. In one embodiment, tracker 117 may analyze the resource acquisition result in a token area and associated data areas for the token to determine whether resource acquisition was successful. For example, performer 116 may acquire the requested resource, and then provide a resource acquisition result that indicates that the requested resource was acquired successfully.

If in step 316, tracker 117 determines that resource acquisition was not successful for the request associated with the token to acquire the resource, then in step 318, tracker 117 determines whether there has been a prior synchronous request initiated for the request associated with the token to acquire the resource. In one embodiment, tracker 117 may reference the token area and associated data areas to determine whether a prior synchronous request has been previously initiated.

If in step 316, tracker 117 determines that resource acquisition was successful for the request associated with the token to acquire the resource, then in step 322, tracker 117 initiates a notification to perform the primary operation, as previously described with regard to step 306.

If in step 318, tracker 117 determines that there has not been a no prior synchronous request initiated for the request associated with the token to acquire the resource, then in step 320, tracker 117 initiates a synchronous request to acquire the resource. As previously discussed, the synchronous request may indicate in the token to suspend certain activity on one or more threads until acquirement of the requested resource is determined, as described in step 316. In one embodiment, tracker 117 may initiate the synchronous request to acquire the resource responsive to a condition. For example, the condition may be based on a time-out threshold that was reached when determining whether the requested resource was acquired successfully or that a general interest count threshold that was reached.

If in step 318, tracker 117 determines that there has been a prior synchronous request initiated for the request associated with the token to acquire the resource, then in step 324, tracker 117 decrements the general interest count by 1. Furthermore, subsequent to issuing a notification to perform the primary operation as described in step 322, tracker 117 may also decrement the general interest count associated with the token. Accordingly, tracker 117 decrements the general interest count decrease an interest of tracker 117 in the request associated with the token to acquire the resource.

In step 326, tracker 117 determines whether to discard the token. In one embodiment, tracker 117 determines whether tracker 117 can successfully discard the token if the general interest count associated with the token is equal to zero, as previously discussed in step 324.

If in step 326 tracker 117 determines to discard the token, then in step 328, tracker 117 discards the token. In this embodiment, tracker 117 discards the token by indicating in the token area and associated data areas that tracker 117 is no longer tracking the token. Furthermore, once tracker 117 discards the token, the token area and associated data areas may be configured to store a new token representing a new request to acquire another resource.

If in step 326 tracker 117 determines not to discard the token, then operational steps as described in flowchart 300 are terminated. In this embodiment, tracker 117 determines not to discard the token if the general interest count was not decremented to a value of "0", as described in step 324.

Figure 4:
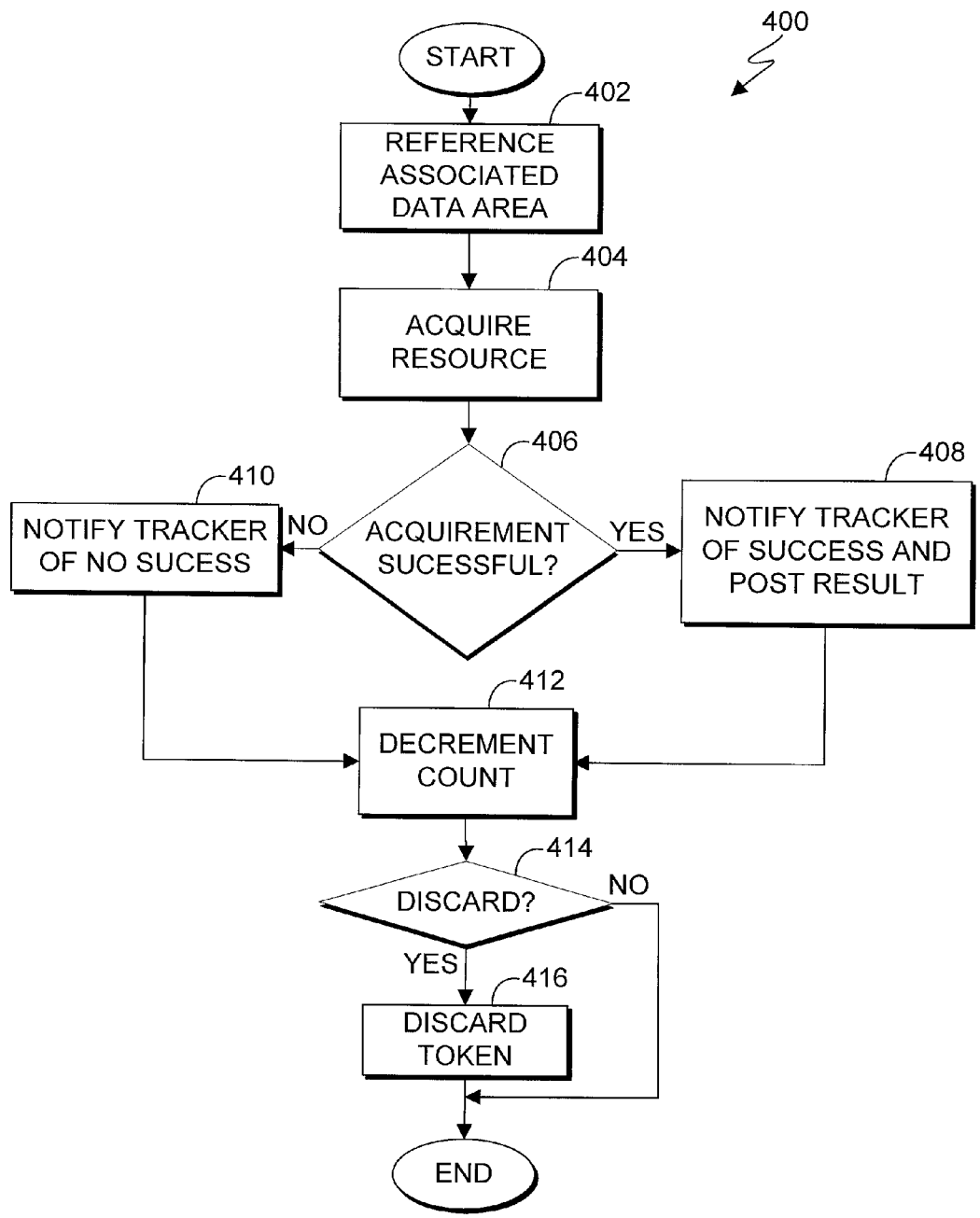
FIG. 4 is a flowchart illustrating operational steps for acquiring the resource and information about the resource, in accordance with an embodiment of the present invention.

FIG. 4 is a flowchart 400 illustrating operational steps for acquiring a resource, in accordance with an embodiment of the present invention. In this embodiment, performer 116 handles an asynchronous request to acquire a requested resource. Furthermore, the operational steps as described herein, may be performed subsequent to initiator 115 notifying performer 116 (step 210, FIG. 2). In another embodiment, performer 116 may handle a synchronous request to acquire the requested resource, initiated by tracker 117, as described in step 320 of FIG. 3.

In step 402, performer 116 references an associated data area. In this embodiment, performer 116 references the associated data area to identify an associated token that is anchored to the associated data area. Accordingly, performer 116 identifies a request to acquire the resource associated with the token that was queued by initiator 115 or tracker 117.

In step 404, performer 116 acquires the resource. In this embodiment, performer 116 acquires the requested resource to facilitate a primary operation. For example, performer 116 may acquire a requested resource from computing environment 100 to allow the primary operation (e.g., offload processing) to proceed.

In step 406, performer 116 determines whether the requested resource was acquired successfully. In one embodiment, performer 116 attempts to acquire the resource, by attempting to allocate or designate the resource, such that the request to acquire the resource is fulfilled. For example, performer 116 may attempt to acquire storage resources from secondary storage 132 to facilitate the primary operation. In this instance, performer 116 may determine whether performer 116 successfully acquired the storage resources from secondary storage 132 by determining whether performer 116 was able to allocate or designate the storage resources to facilitate the primary operation (e.g., offload processing).

If in step 406 performer 116 determines that the requested resource was acquired successfully, then in step 408, performer 116 issues a notification to tracker 117 indicating that the resource was successfully acquired. In this embodiment, performer 116 also posts the resource acquisition result to an associated data area of the token so that tracker 117 may analyze the resource acquisition result when tracker 117 performs operational steps to track a request to acquire the resource, as previously described in step 316 of FIG. 3.

If in step 406 performer 116 determines that the requested resource was not acquired successfully, then in step 410, performer 116 issues a notification to tracker 117 indicating that the resource was not successfully acquired. In one embodiment, performer 116 issues the notification of the unsuccessful acquirement of the requested resource to tracker 117, such that tracker 117 is updated with an acquisition status for the requested resource.

In step 412, performer 116 decrements the general interest count. In one embodiment, performer 116 may issue a notification to tracker 117 indicating that the requested resource was acquired successfully or not successfully. In either instance, performer 116 decrements the general interest count associated with the token by 1. Accordingly, performer 116 decrements the general interest count to decrease a weight or a demand in the request associated with the token to acquire the resource for performer 116.

In step 414, performer 116 determines whether to discard the token. In one embodiment, performer 116 determines whether to discard from the token (i.e., make available the token area and associated data areas) when the general interest count is equal to zero.

If in step 414 performer 116 determines to discard the token, then in step 416, performer 116 discards the token. In this embodiment, performer 116 discards the token by indicating in the token area and associated data areas that performer 116 is no longer tracking the token. Furthermore, once performer 116 discards the token, the token area and associated data areas may be capable of storing a new token representing a new request to acquire another resource.

If in step 414 performer 116 determines not to unregister from the token, then operational steps as described in flowchart 400 are terminated.

Figure 5:
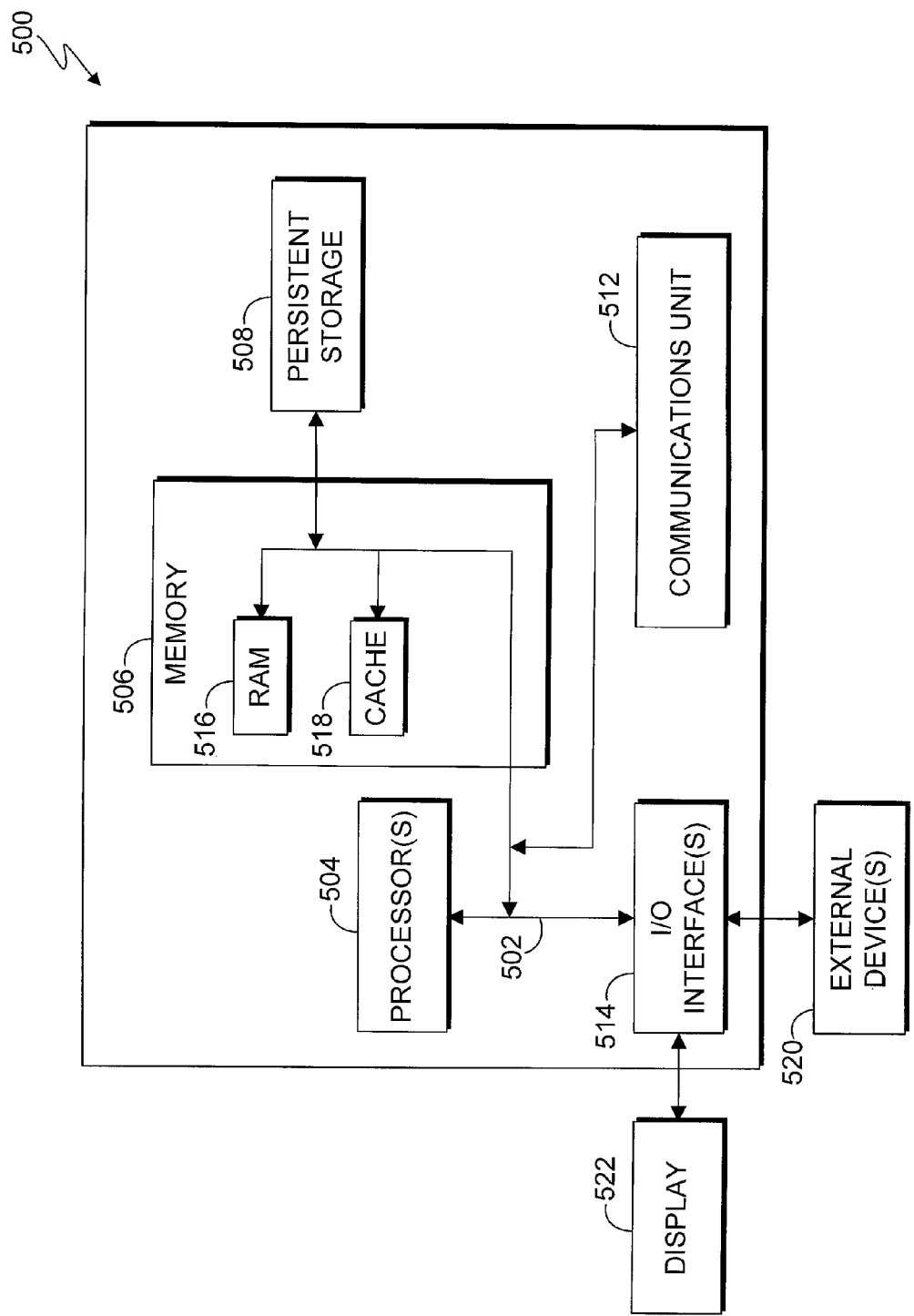
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
one or more computer readable storage media and program instructions stored on the one or more computer readable storage media, the program instructions comprising:
program instructions to receive a first request to acquire one or more resources for resource management in a computing environment;
program instructions to determine whether the one or more resources have been pre-acquired;
program instructions to, responsive to determining that the one or more resources have not been pre-acquired, subscribe to a token by registering interest of a first thread of a plurality of threads in the first request, wherein the token manages information associated with the first request and can be accessed by each of the plurality of threads, and wherein the plurality of threads include: an initiator thread, a performer thread, and a tracker thread, wherein the initiator thread receives the first request and instructs the performer thread to acquire the one or more resources, and the tracker thread tracks status of acquisition of the one or more resources;
program instructions to determine whether the acquisition of the one or more resources is successful;
program instructions to, responsive to determining that the acquisition of the one or more resources is not successful, determine whether a prior synchronous request has been initiated, by a thread of the plurality of threads, for the first request;

program instructions to, responsive to determining that the prior synchronous request has not been initiated, initiate a synchronous request to acquire the one or more resources;

program instructions to receive a second request to acquire the one or more resources to perform resource management in the computing environment;

program instructions to, responsive to determining that the one or more resources have not been pre-acquired, register an interest of a second thread of the plurality of threads in the first request using the token;

program instructions to determine whether the acquisition of the one or more resources is successful; and program instructions to, responsive to determining that the acquisition of the one or more resources is successful, notify the thread of the plurality of threads of a successful acquisition result, and unregistering the interest of the second thread of the plurality of threads in the first request.

* * * * *